United States Patent [19]
Justice

[11] Patent Number: 5,252,226
[45] Date of Patent: Oct. 12, 1993

[54] LINEAR CONTAMINATE REMEDIATION SYSTEM

[76] Inventor: Donald R. Justice, 5260 S. Landings Dr., Ft. Myers, Fla. 33919

[21] Appl. No.: 882,228

[22] Filed: May 13, 1992

[51] Int. Cl.$^5$ .......................... B01D 19/00; E21B 7/00
[52] U.S. Cl. ..................................... 210/739; 175/62; 210/188; 210/747; 210/805; 405/128
[58] Field of Search ................. 405/128, 36; 210/96.1, 210/143, 170, 188, 739, 747, 749, 805, 806; 175/57, 62

[56] References Cited

U.S. PATENT DOCUMENTS

| | | | |
|---|---|---|---|
| 3,425,555 | 2/1969 | Ridgeway | 210/170 |
| 4,435,292 | 3/1984 | Kirk et al. | 210/749 |
| 4,600,508 | 7/1986 | Deghetto | 210/170 |
| 4,871,281 | 10/1989 | Justice | 405/181 |
| 4,895,085 | 1/1990 | Chips | 405/128 |
| 5,118,230 | 6/1992 | Justice | 405/128 |

*Primary Examiner*—Joseph W. Drodge
*Attorney, Agent, or Firm*—Jacobson, Price, Holman & Stern

[57] ABSTRACT

A series of horizontally extending drainage pipes forming a grid system are located at or below the level of a plume of liquid contamination. The drainage recovery pipes skim off the surface of the water table, along with the plume of contamination. This minimizes the time required for removal of water that needs to be pumped from the ground and cleaned. Once the contaminant is pumped from the ground, it is delivered to a conventional treatment system where it is cleaned and then the cleaned water is returned back to the ground water table. This cleaned water is reintroduced over the grid system and is drawn through the soil to flush out any remaining contaminants in the soil. Once the treated water reaches the water table, the liquid contaminants are usually less dense than water and rise towards the surface of the water table. The contaminants are then removed by the grid system for treatment.

17 Claims, 8 Drawing Sheets

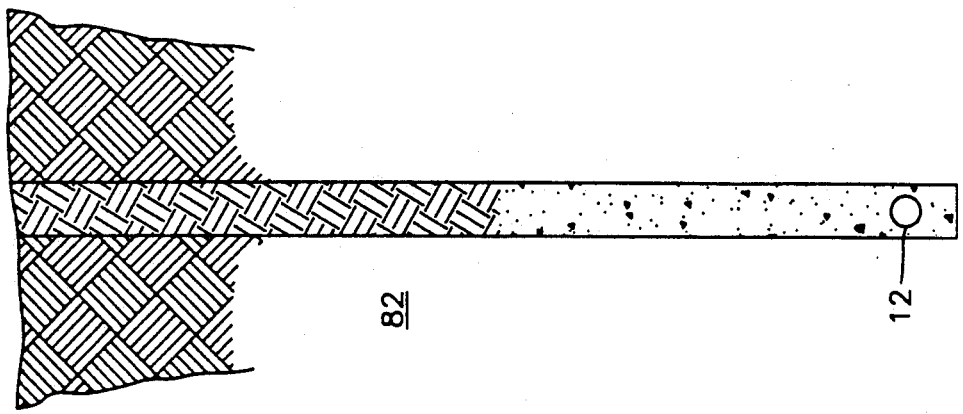
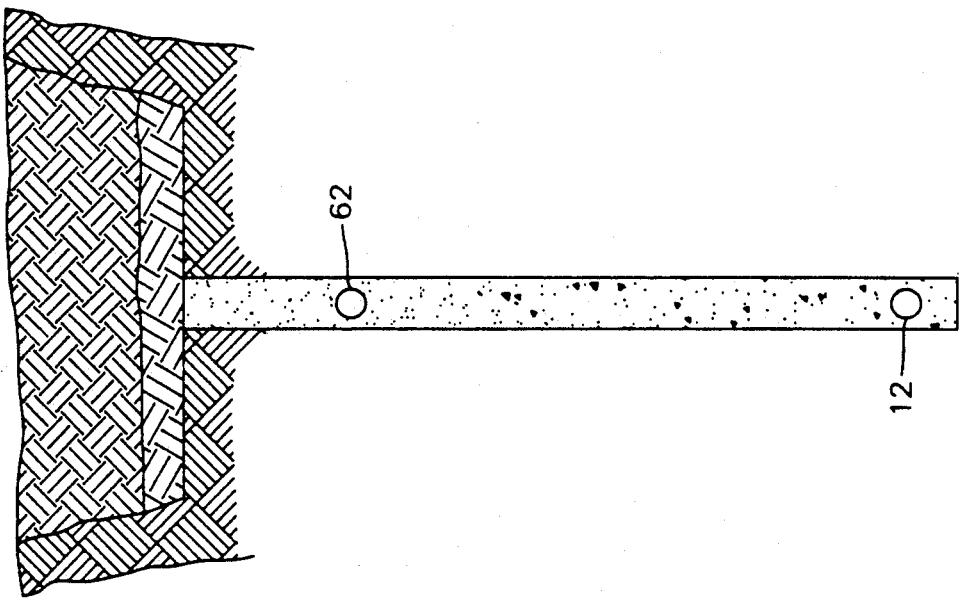
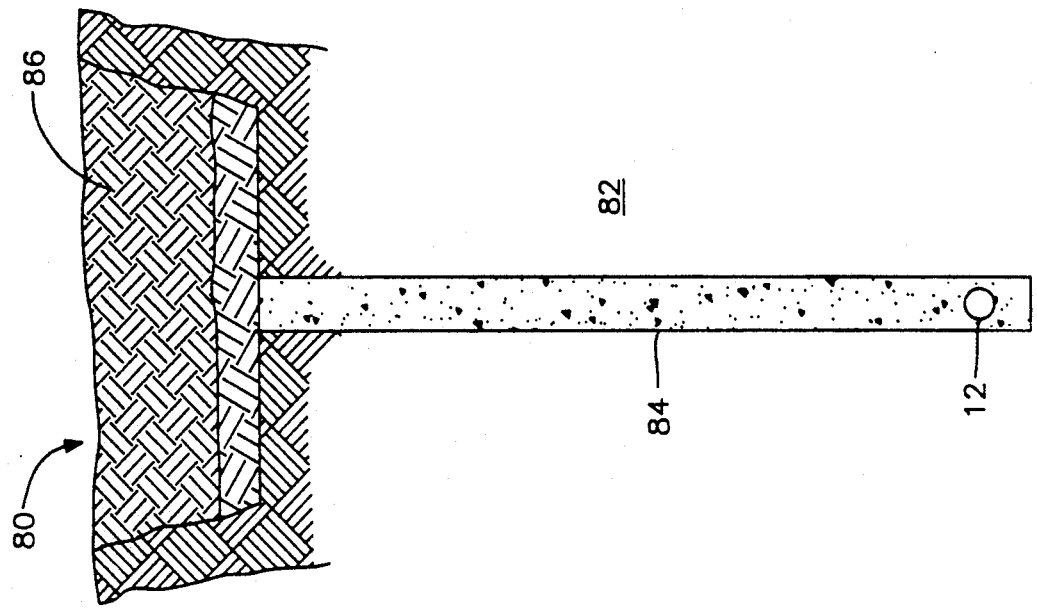

LINEAR CONTAMINATE REMEDIATION SYSTEM

FIELD OF THE INVENTION

This invention is concerned with placing a horizontally extending grid system across a plume of liquid contamination contained within the water table. The grid system will remove the plume of contamination by lowering the water table and evacuating the contamination plume.

BACKGROUND OF THE INVENTION

Previous attempts to remove a plume of liquid contamination contained below ground have included placement of numerous vertical wells placed around the periphery of the plume. The vertical wells are operated continuously in an attempt to draw the liquid of a contamination plume towards the vertical well system. Great amounts of water are pumped out of the ground by these vertical wells at a great cost and over an extended period of time.

These plumes of liquid are known to contain such dangerous substances as diesel fuel, jet fuel, gasoline, heating oil, creosote, and other chemicals, for example. Sources of contamination are thousands of aging underground tanks buried beneath schools, government offices, gasoline stations, businesses and abandoned property distributed throughout the United States. This problem has often times resulted in homeowners being forced from their homes due to condemning of their homes by public officials due to the extreme hazard and health risks involved.

The presence of these contaminants in the water table present a continuous potential health hazard to the population. Rural and suburban residents who use wells for the source of their drinking water are particularly affected by this problem. It is estimated that half of the country relies on this type of source for their drinking water. The removal of these contaminants is therefore required to help ensure a potable water supply.

In 1988, the Environmental Protection Agency (EPA) issued regulations requiring that new underground tanks meet minimum standards. Owners of older tanks were forced to close or upgrade their tanks. Since these regulations have been implemented, 130,000 leaks have been documented. Experts expect hundreds of thousands of more leaks to be discovered in the future. The new EPA rules have been estimated to apply to 1.8 million tanks nationwide. This number excludes millions of home heating oil, farm and other smaller underground tanks potentially subject to producing leaks.

SUMMARY OF THE INVENTION

By the present invention a series of horizontally extending drainage recovery pipes are located at or below the level of a plume of liquid contamination. The drainage recovery pipes skim off the surface of the water table, along with the plume of contamination. This method minimizes the number of gallons of water that needs to be removed from the ground and cleaned.

Once the contaminant is pumped from the ground, it is delivered to a conventional treatment system where it is cleaned and then the cleaned water is returned back to the ground water table. This cleaned water is reintroduced over the grid system of the invention and is drawn through the soil to flush out any remaining contaminants in the soil. Once the treated water reaches the water table, the liquid contaminants are usually less dense than water and rise towards the surface of the water table. The contaminants are then removed by the grid system for treatment.

A plurality of horizontally extending drainage recovery pipes are located below the ground on 15 to 100 foot centers in or below the level of a plume of liquid contamination dependent on the volume and spread of the contamination. This depth of the horizontally extending drainage recovery pipes may vary from 8 to 30 feet below ground level and is dependent upon the variable height of the water table.

The horizontally extending drainage pipes are used in cleanup efforts on contaminated sites, both for contaminated water and contaminate extraction. Aquifer recharge is obtained by using treated and/or processed water which is returned to the water table. The horizontally extending drainage recovery pipes are laid in a series of parallel trenches at or below the level of the plume of contamination. The trenches are dug by specialized equipment as described in my U.S. Pat. No. 4,871,281, hereby incorporated by reference.

It is not required that personnel work in the excavated trenches for placement of the recovery pipes, thus reducing exposure to contaminants and other safety hazards. Also, the recovery pipes are locatable at the desired pumping points, even in saturated soils. This minimizes the need for off-site handling and disposal of contaminated free product and water which is extremely costly and hazardous.

The drainage recovery pipe, including a filter casing, is placed along with filter sand in the trench and the trench is back-filled with the same soil removed to dig the trench. By the burial of the horizontally extended drainage recovery pipe at or below the site of contamination, ground water removal is minimized while containment recovery is maximized to thereby reduce waste water treatment volume and operational costs. As the water table is lowered, the plume of liquid contamination is lowered into direct contact with the drainage recovery pipes.

By utilization of a soil benching installation method, the need to handle contaminated soils from the excavations, disposal, either on site or off-site, is minimized or eliminated. The project costs and hazardous exposure to personnel is thereby reduced.

In the soil benching installation method, non-contaminated surface soils are excavated to depths of 3-6 feet and stored on site. The installation equipment is operated in the excavated or benched area to excavate contaminated soil. The excavated contaminated soils are deposited along the trench line in the bottom of the trenched area. After the recovery pipe installation is completed, the stored on-site, non-contaminated surface soils are replaced in and over the benched area.

The grid system incorporating the horizontally extending drainage recovery pipe includes a plurality of lengths of pipe extending 600 linear feet. The pipe is preferably six inch diameter high density polyethylene encased by a filter cloth. A central eight inch diameter PVC riser is located in the middle of each length of drainage pipe. At a location above ground, each of the vertical risers are interconnected by a suction header which transfers withdrawn water and contamination to a processing facility.

The horizontal extending pipes have a clean-out/air relief vertically rising section at the outer ends of each 600 foot length of pipe. Therefore, there are two clean-out/air relief sections for each horizontal length of pipe. Access is thereby facilitated at both ends and a mid-point of the drainage recovery pipe for removal of contaminated liquid.

It is possible to remove the upper level of the ground water table along with the harmful contamination plume by pumping out a plurality of horizontally extending drainage recovery pipes over a 24 hour period one time a week, for example. The actual pumping time will vary according to the extent of contamination and the proximity of the recovery pipes to the plume of contamination.

All of the liquid removed is passed through a carbon filter system and is ultimately treated for removal of contaminants. The filtered liquid may be returned to the ground above the horizontal pipe drainage recovery system so that the liquid passes through the soil to the water table in a soil washing system which assists in the removal of contamination from contaminated soil. This is equivalent to a "site dialysis" which is used to continuously circulate liquid to flush contaminant from the water supply. The level of contamination is thereby significantly reduced to an acceptable level.

This system can also be utilized as a vapor extraction process, either independently or in conjunction with a free product/water recovery system. Upper vapor recovery piping can be utilized as recharge points of treated water at an area directly over a contaminated plume area, thereby enhancing soils flushing and the area cleanup process. Additional air can be induced into the lower free product and water recovery pipes which allows enhancement of vaporization of the plume contaminants and vapor recovery by the upper system.

Flow recovery rates of free product and water recovery are adjustable from time to time with balancing valves from individual recovery runs to minimize the circulation in the recovery/treatment cycle of low contaminated waters. This maximizes the recovery and treatment of higher contaminated waters.

The site specific grid systems of the invention can include a perimeter recovery system around the plume. This can not only be utilized in the recovery treatment process, but can also serve as a plume containment installation.

It is therefore an object of the present invention to provide a method of removing a plume of liquid contamination by reducing the level of the water table and thereby collect and remove the plume of liquid contamination.

It is another object of the present invention to provide a method of removing a plume of liquid contamination by reducing the level of the water table and thereby collect and remove the plume of liquid contamination with a plurality of horizontally extending drainage recovery pipes located at or below the level of the plume of contamination.

It is still another object of the present invention to provide a method of removing a plume of liquid contamination by reducing the level of the water table and thereby collect and remove the plume of liquid contamination with a plurality of horizontally extending drainage recovery pipes located at or below the level of the plume of contamination with the horizontally extending drainage recovery pipes having a vertical riser for removal of contaminated liquid and passage of the contaminated liquid to a filter system.

It is still another of the present invention to provide a method of removing a plume of liquid contamination by reducing the level of the water table and thereby collect and remove the plume of liquid contamination with a plurality of horizontally extending drainage recovery pipes located at or below the level of the plume of contamination with the horizontally extending drainage recovery pipes having a vertical riser for removal of contaminated liquid and passage of the contaminated liquid to a filter system with the contaminated liquid being filtered and returned to the site of the horizontally extending drainage recovery pipes for passage through the soil above the drainage recovery pipes so as to flush contaminants from the soil and towards the drainage recovery pipes.

These and other objects of the invention, as well as many of the intended advantages thereof, will become more readily apparent when reference is made to the following description taken in conjunction with the accompanying drawings.

BRIEF DESCRIPTION OF THE DRAWINGS

FIGS. 10 through 12 illustrate various trenching operations.

DETAILED DESCRIPTION OF THE PREFERRED EMBODIMENTS

Figure 1:
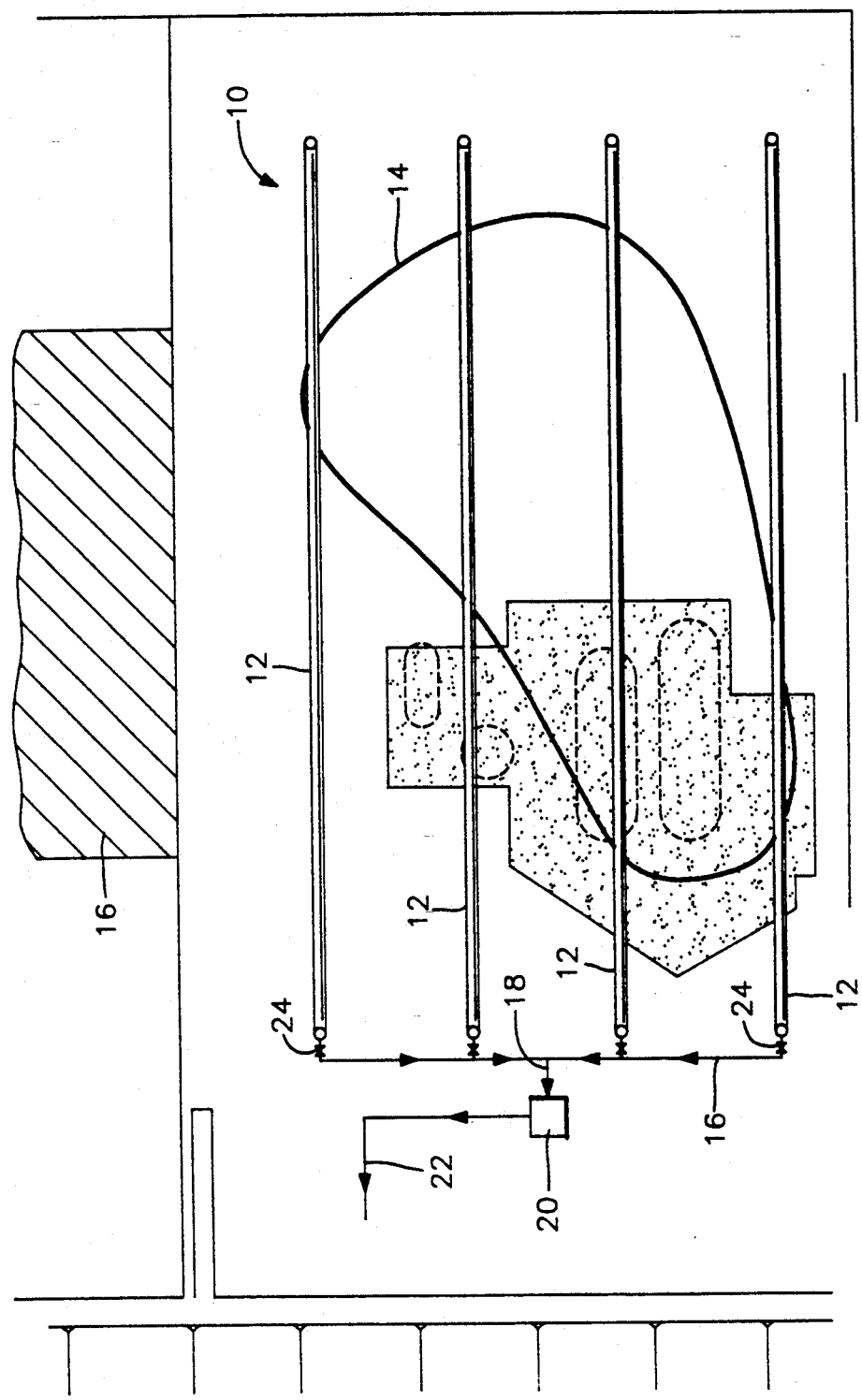
FIG. 1 is a top plan view of a contamination site having a plume of liquid contamination with a linear contaminated waste recovery system in place.

In describing a preferred embodiment of the invention illustrated in the drawings, specific terminology will be resorted to for the sake in clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1 in particular, a linear contaminated waste recovery system embodying the teachings of the subject invention is generally designated as 10. The containment system includes a plurality of buried horizontally extending drainage recovery pipes or horizontal well screen 12 which are located at or below the level of a buried plume of contaminated liquid 14.

In this example, a former public works building 16 has, over the years, leaked fuel contaminant into the ground. These contaminants have collected and are a potential danger to the water supply. By burying the recovery pipes 12 below or at the level the plume 14 of liquid contamination, the water table is thereby lowered and the plume 14 is lowered into direct contact with the drainage recovery pipes 12 for evacuation from the water table.

Figure 2:
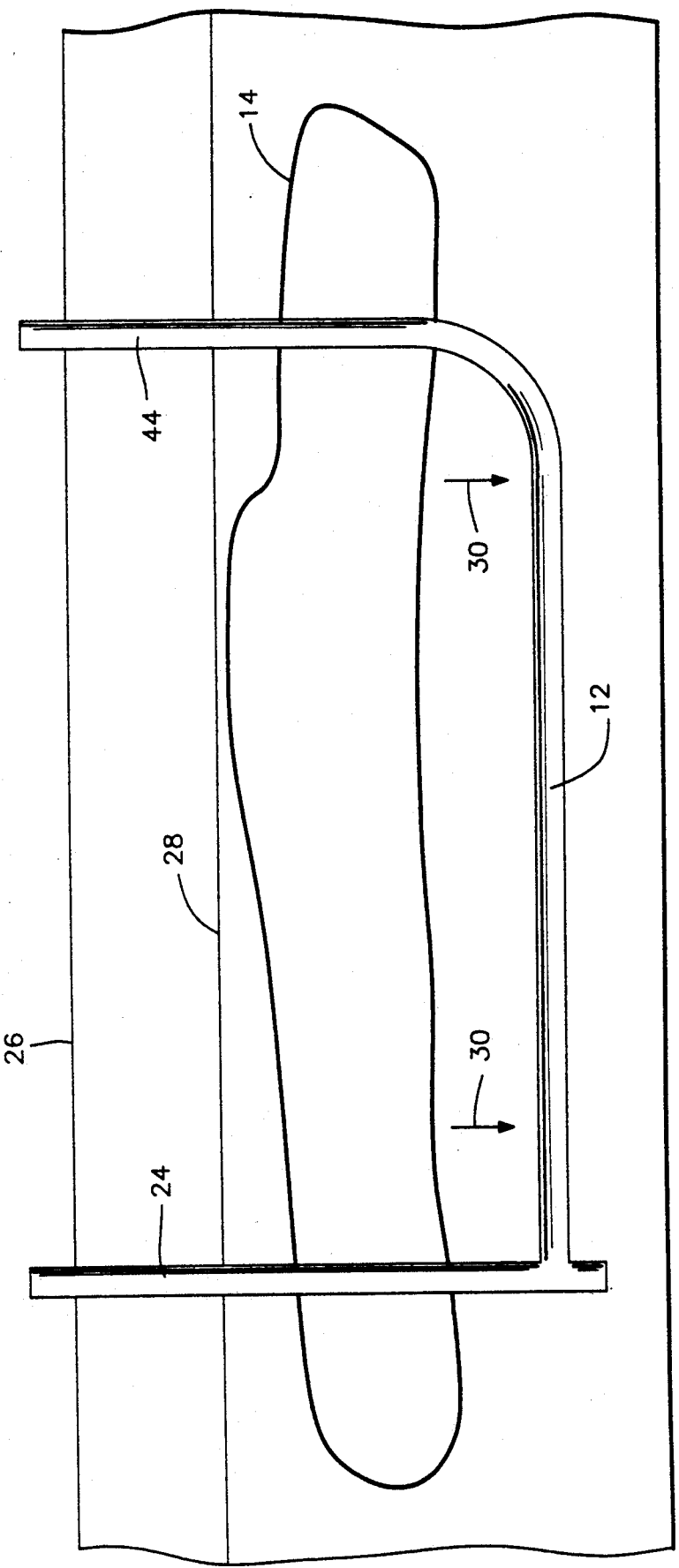
FIG. 2 is a sectional view of a linear contaminated waste recovery system in place having a horizontally extending drainage recovery pipe located below a plume of liquid contamination.
Figure 4:
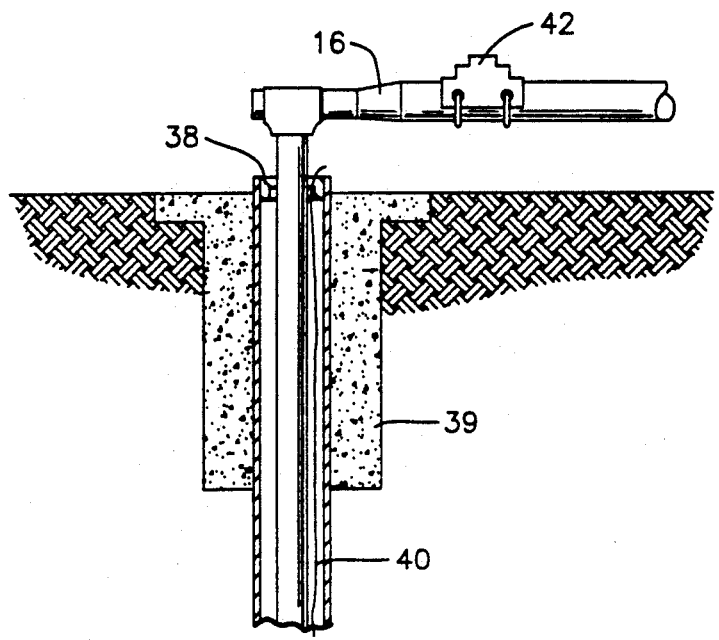
FIG. 4 is a partial sectional view of a horizontal well vertical header and riser.
Figure 5:
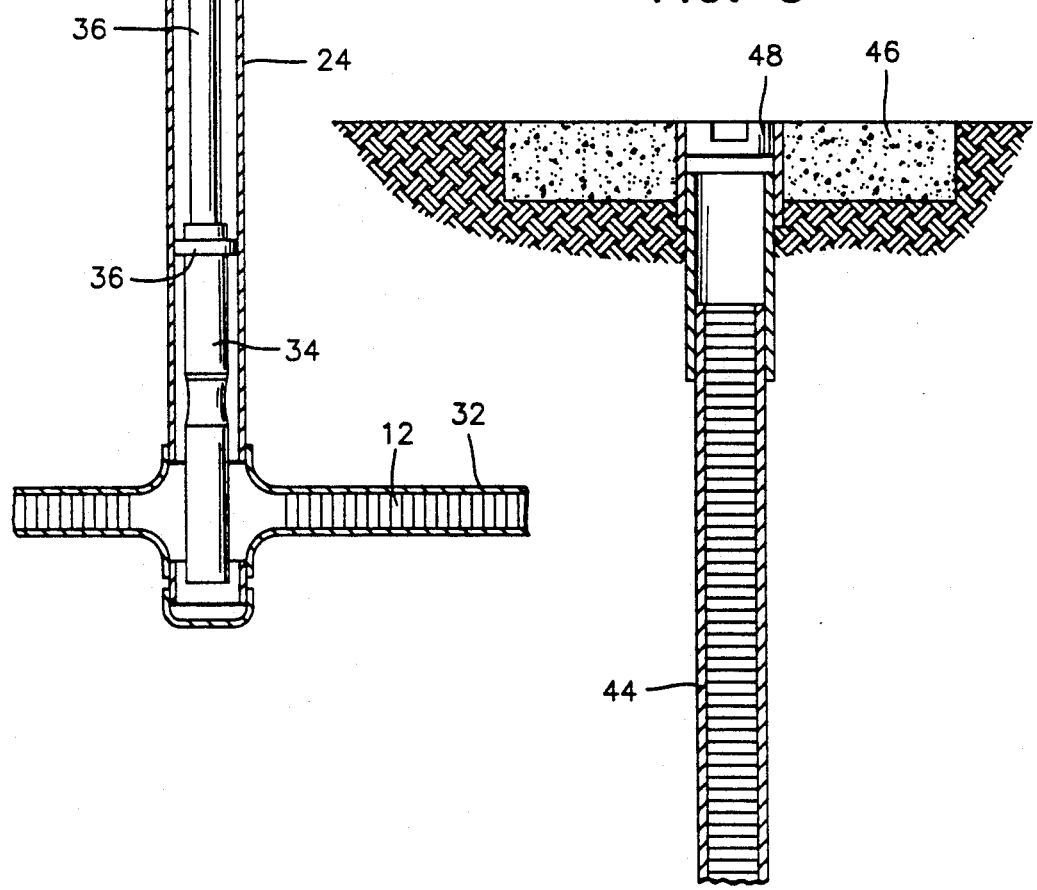
FIG. 5 is a partial sectional view of a horizontal well flexible riser clean-out.

The recovery pipes 12 are connected to a suction header 16 which is above ground level. The suction header 16 is connected to the recovery pipes by a vertical riser 24 as shown in FIGS. 2, 4 and 5. The riser may actually rise vertically at an angle of from 30° to 90° dependent on the location of the pump, above or below ground, and the desired pumping volume.

The suction header is connected by a transfer pipe 18 to an above ground pumping unit 20. It is not necessary that the pumping unit be located above ground, but rather the pumping unit may be of a below ground type as depicted in my U.S. Pat. No. 4,927,292, hereby incorporated by reference.

A discharge pipe 22 is connected to the pumping unit to convey the liquid withdrawn by the recovery pipes to a treatment facility. It is possible, as will be explained with reference to FIG. 6 to return the treated liquid to the ground above the recovery pipes so as to use the treated liquid to help flush out the soil above the recovery pipes for evacuation of any remaining contaminants from the soil for treatment at a treatment facility.

In FIG. 2, a recovery pipe 12 is shown connected to a vertical riser 24 which extends to above ground level 26 for removal of liquid below the upper surface 28 of the water table. The plume 14 of contaminated liquid is shown being located near the upper surface 28 of the water table. Typically, the contaminated liquid will be of a density less than water and will float to the upper surface of the water table. As the water table is lowered by water entering recovery pipes 12 and evacuation of the contaminated liquid through vertical riser 24, the level of the upper surface 28 of the water table and the plume 14 itself, will be lowered as moved in the direction of arrows 30 and evacuated by the recovery pipe 12.

Figure 3:
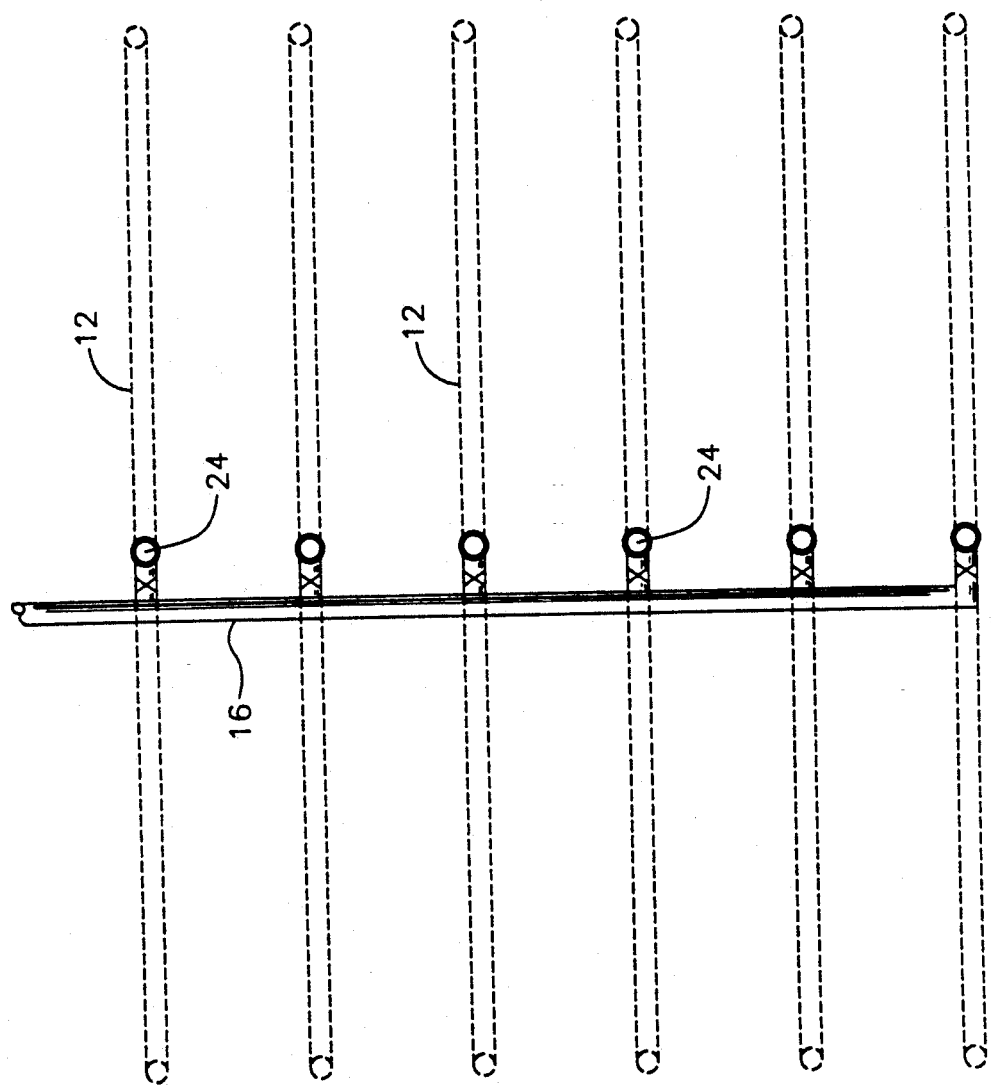
FIG. 3 is a plan view of a linear contaminated waste recovery system.

Typically, a plurality of rows of recovery pipes 12, as shown in FIG. 3, will be connected to their respective vertical risers 24 for connection to a suction header 16 and ultimate removal of contaminated liquid to a waste treatment facility. In the example shown, the recovery pipes extend for a distance of 600 feet and are spaced at 100 feet centers. The separation of the recovery pipes will depend upon the volume and the extent of spread of the plume 14 of contaminated liquid.

In FIG. 4, the details of recovery of contaminated liquid from corrugated recovery pipe 12 are shown. The recovery pipe 12 surrounded by a filter cloth 32 is connected to an eight inch PVC vertical riser 24. Within the header 24 is a submersible pumping unit 34 having a surrounding seal 36. The pumping unit 34 is connected to a 3-inch discharge pipe 36 and passes through a well head seal 38 in concrete seal 39 for connection with a suction header 16. Electric leads 40 pass through the well head seal to the pumping unit for energizing the pumping unit. The suction header 16 is a 4-inch discharge pipe having a water meter 42 for measuring the amount of contaminated liquid extracted.

At the opposite end of the recovery pipe 12 from the vertical header 24 is a flexible riser 44 as shown in FIGS. 2 and 5. The flexible riser terminates at a concrete seal 46 having a six-inch counter sunk plug 48 for access to the riser 44 and clean-out of the riser in the event the recovery pipe becomes clogged.

Figure 6:
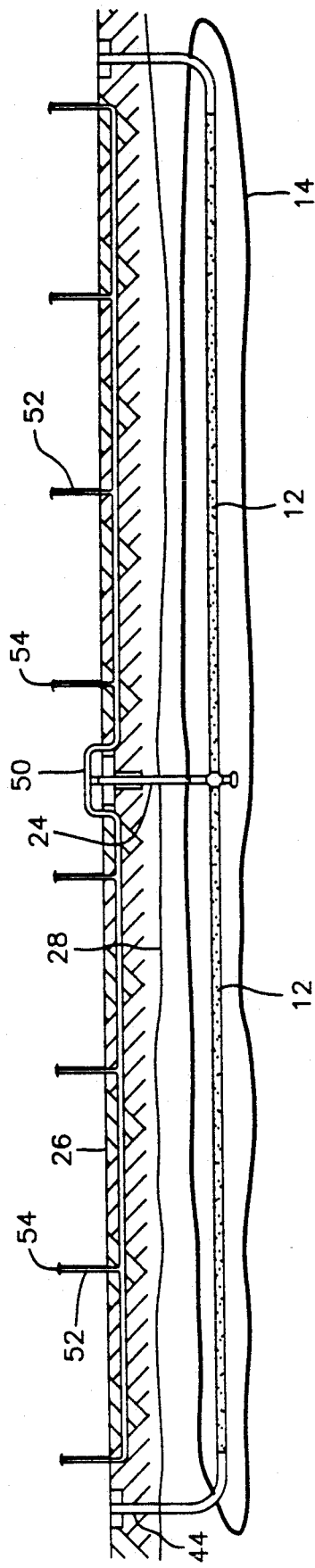
FIG. 6 is a sectional view of a linear contaminated waste recovery system with filtered liquid flushing system.

In a preferred embodiment as shown in FIG. 6, recovery pipe 12 is located within plume 14 of contaminated liquid near the upper surface 28 of the water table. As the contaminated liquid of the plume 14 is gathered in the recovery pipes 12, it is pumped from the vertical riser 24 and ultimately to a waste treatment facility.

The treated liquid is returned by return pipe 50 and spread over the soil by a plurality of vertical irrigation poles 52. Irrigation poles 52 include a sprinkler head 54 for distribution of the treated liquid over the soil. The treated liquid passing through the soil acts to flush the soil and move any contaminants that may be contained in the soil towards the recovery pipes 12 and its surrounding plume 14 of contaminated liquid. This "site dialysis" forces contaminants out of the soil and aids in removing the contaminants from the water table. This process is repeated until the level of contamination of the soil is reduced and of the plume 14 of contaminated liquid is removed.

Flushing of the soil and removal of the plume is accomplished in a greatly reduced time period involving a substantially reduced amount of liquid to be treated. Therefore, once a site of liquid contamination is located, the horizontally extending recovery pipes 12 are located in place to draw down the water table and thereby encounter the plume of contaminated liquid to remove the plume.

Figure 7:
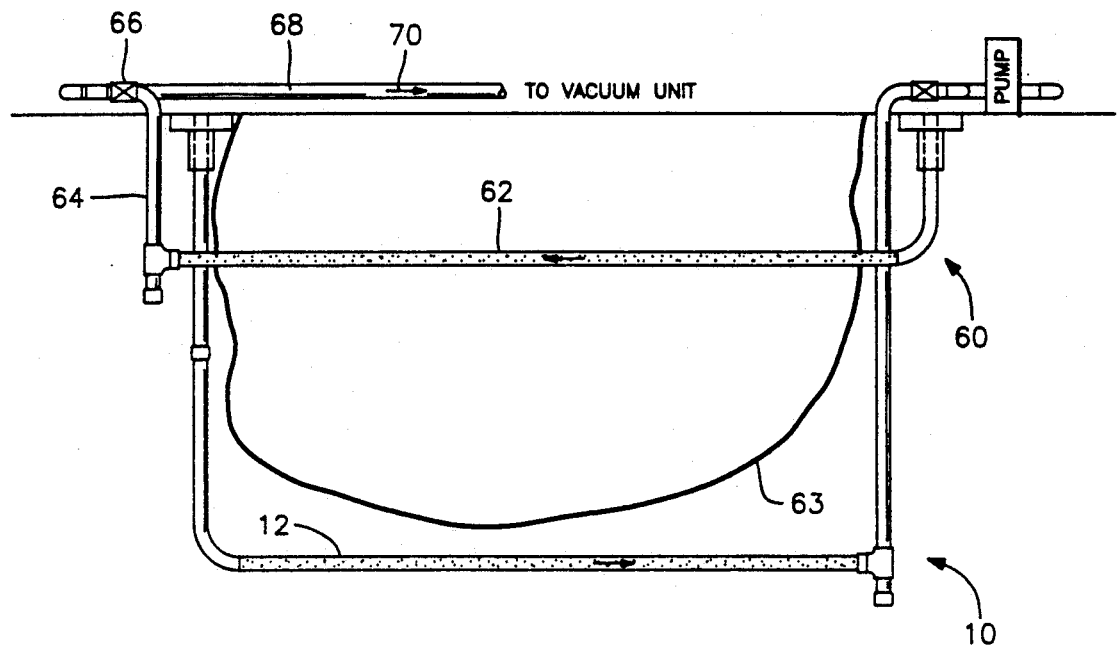
FIG. 7 is a sectional view of a linear contaminated waste recovery system and vapor recovery system.
Figure 8:
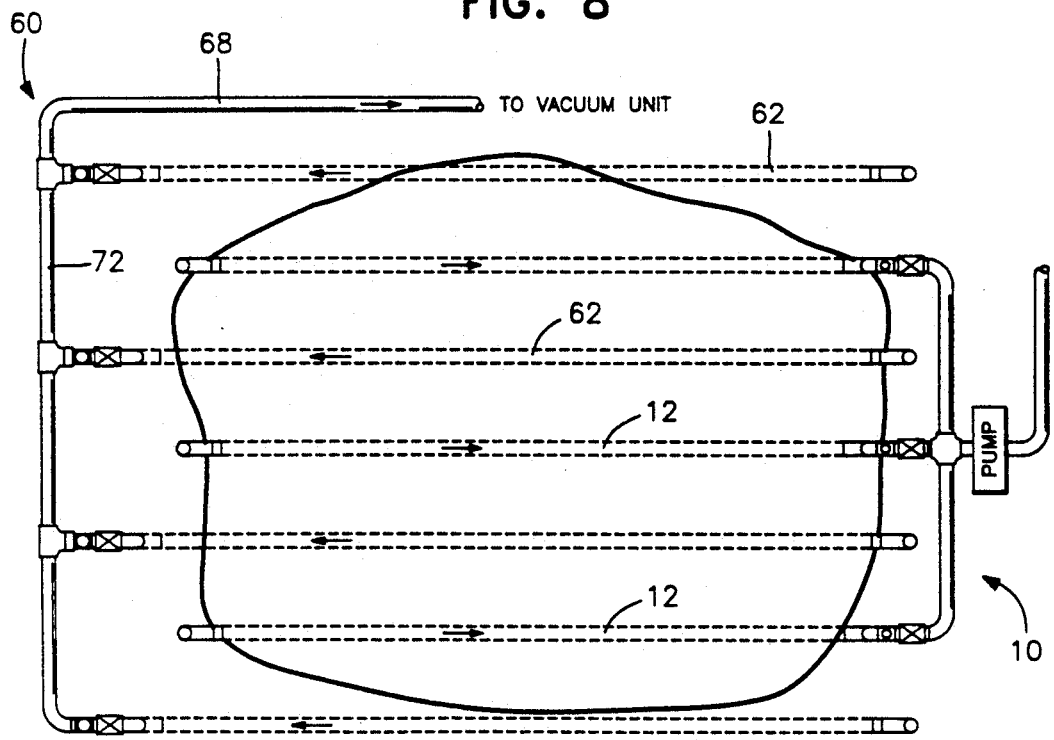
FIG. 8 is a top plan view of the systems shown in FIG. 7.
Figure 9:
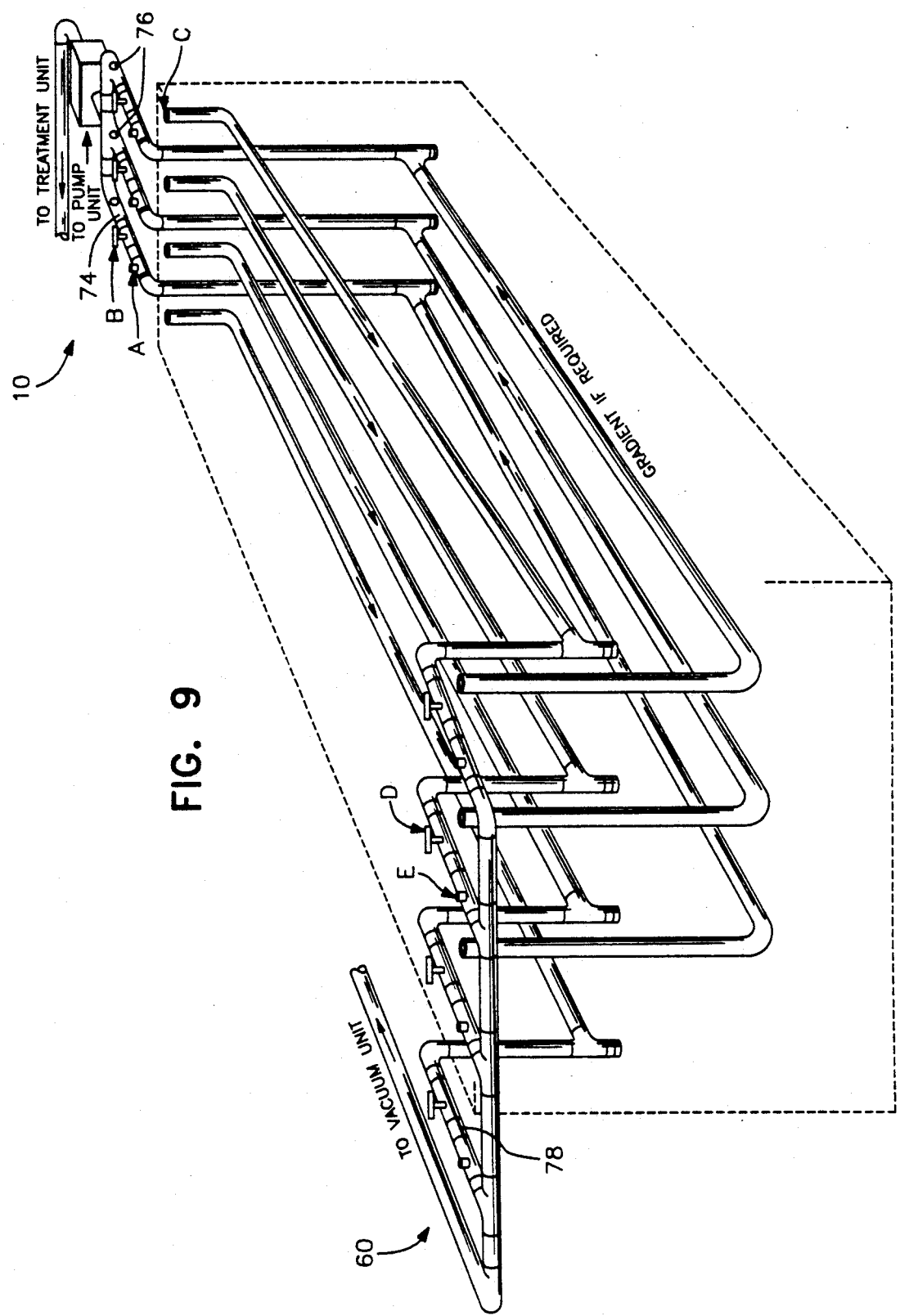
FIG. 9 is a perspective view of the systems shown in FIGS. 7 and 8.

In FIGS. 7 through 9, a vapor recovery or extraction system 60 is shown used in combination with a linear contaminated waste recovery system 10. System 60 includes a plurality to lengths of horizontally extending perforated pipe 62 spaced at a distance above the drainage recovery pipe 12 of system 10. Pipe 62 is positioned within the soil 63 above the water table.

Pipe 62 is connected to a vertical riser 64 which is connected at a point 66 to an evacuation tube 68 for withdrawing air in the direction of arrow 70 as caused by a vacuum unit. Gases rising from the plume of contaminated liquid are forced into pipe 62 and removed from a site of contamination.

In FIG. 8, the inter-lineation of pipes 62 of system 60 and pipes 12 of system 10 are shown. In FIG. 8, a header 72 is shown to which the plurality of pipes 64 are connected for evacuation through evacuation tube 68. Pipes 62 may also be used for a return of treated fluid to a site of a plume as described with respect to FIG. 6 so as to rinse the soil and carry contaminants towards the recovery system 10 located adjacent to a plume of contaminated liquid.

In FIG. 9, additional details of the systems 10 and 60 are shown. Each drainage recovery pipe 12 includes in a section of pipe 64 a flow meter A for measuring the rate of flow of product from recovery pipes 12 as controlled by an equalizing valve B. Dependent upon samples removed from a sampling port 76, it is determined to what extent contaminated product is being removed from a recovery site. If it is determined that a low level of contamination is being removed from a particular recovery pipe, its equalizing valve is varied to reduce the rate of flow as measured by flow meter A so as to reduce the amount of water being drawn from the water table through a particular recovery pipe. Conversely, in the recovery pipes 12 measuring a high degree of contaminant in the product removed from the recovery pipe, the equalizing valve is opened to increase the rate of flow of product and thereby increase the amount of contaminant removed.

In the vapor recovery system 60, a length of pipe 78 includes an equalizing valve D and a manometer tap port E for each pipe section 62. Similar to recovery system 10, dependent upon the amount of gas removed by each pipe section 62, the amount of suction exerted on a particular pipe is varied by the turning of equalizing valve D as measured at the manometer tap port E.

In FIGS. 10 and 11, a benched area 80 of non-contaminated soil is removed over a 12-14 foot width to a depth dependent on a soil contamination survey to access non-contaminated soil. After initiating removal of the benched area, a trenching operation is performed through contaminated soil 82 at a width of approximately 14 inches within which recovery pipe 12 is buried by back-filling contaminated soil within the trench 84. The non-contaminated soil 86 is then returned into the benched area 80 to seal the contaminated soil and prevent exposure of contamination to the trenching personnel.

In FIG. 11, a similar operation is performed with burial of a vapor recovery pipe 62. This is contrasted to the trenching of non-contaminated soil as shown in FIG. 12 for burial of any recovery pipe 12.

Having described the invention, many modifications thereto will become apparent to those skilled in the art to which it pertains without deviation from the spirit of the invention as defined by the scope of the appended claims.

I claim:

1. A method for removing a plume of contaminated liquid from the earth, said method comprising:
   locating a plume of contaminated liquid,
   positioning a plurality of rows of parallel, horizontally extending perforated recovery pipes at a depth substantially at or below the depth to which the plume of contaminated liquid extends,
   removing water from the water table to move the plume of contaminated liquid into contact with the recovery pipes,
   removing the plume of contaminated liquid from below ground level by passage through the horizontally extending recovery pipes as the plume moves into the horizontally extending recovery pipes,
   positioning a vapor recovery system above the recovery pipes and below ground level to recover vapors generated by the plume including substantially horizontal pipes with open perforations.

2. A method according to claim 1, wherein said recovery pipes are positioned below the plume of contaminated liquid.

3. A method according to claim 1, wherein a pumping unit forces liquid entering the recovery pipes to an above ground location.

4. A method according to claim 3, wherein a treatment facility treats water entered into the recovery pipes.

5. A method according to claim 4, wherein the treatment facility is located above ground level.

6. A method according to claim 4, wherein the plume occupies a site and water treated by the treatment facility is returned to the site of the plume of contaminated liquid for release above the site of the plume of contaminated liquid so as to pass through the soil towards the site of the plume of contaminated liquid.

7. A method according to claim 6, wherein water treated by the treatment facility, after passing through the soil, is removed by the recovery pipes for a second treatment at the treatment facility.

8. A method according to claim 1, wherein the recovery pipes are positioned to extend across the plume of contaminated liquid.

9. A method according to claim 1, wherein a volume of flow through the recovery pipes is varied dependent upon the degree of contamination passing through each recovery pipe.

10. A method for removing a plume of contaminated liquid from the earth, said system comprising:
    burying a plurality of horizontally extending perforated recovery pipes at a depth substantially at or below the depth to which the plume of contaminated liquid extends,
    positioning a vapor recovery system above the recovery pipes and below ground level to recover vapors generated by the plume including substantially horizontal pipes with open perforations,
    pumping liquid entering the recovery pipes to an above ground location, and
    treating the liquid pumped to the above ground location to remove contaminants.

11. A method according to claim 10, wherein the recovery pipes are buried below the plume of contaminated liquid.

12. A method according to claim 10, wherein the plume occupies a site and the treated liquid is returned to the site of the buried recovery pipes and released above the buried recovery pipes so that the treated liquid passes through the soil towards the buried recovery pipes.

13. A method according to claim 12, wherein the treated liquid, after passing through the soil, is removed by the recovery pipes for a second treatment to remove contaminants.

14. A method according to claim 10, wherein the buried recovery pipes extend parallel to each other.

15. A method according to claim 10, wherein the plume of contaminated liquid is located adjacent to an upper surface of the water table and the plume of contaminated level is lowered vertically across the buried recovery pipes to move the plume of contaminated liquid into contact with the recovery pipes.

16. Method according to claim 10, wherein a volume of flow through the recovery pipes is varied dependent upon the degree of contamination passing through each recovery pipe.

17. A method for removing a plume of contaminants from the earth, said method comprising:
    locating a plume of contaminants,
    positioning a plurality of rows of parallel, horizontally extending perforated recovery pipes at a depth substantially at or below the depth to which the plume of contaminants extends, and
    positioning a vapor recovery system above the recovery pipes and below ground level to recover vapors generated by the plume including substantially horizontal pipes with open perforations.

* * * * *